A. C. Eddy,
Mallet.

N°52,696.    Patented Feb. 20, 1866.

Witnesses
W. B. Vincent
J. D. Thurston

Inventor
Albert C. Eddy

UNITED STATES PATENT OFFICE.

ALBERT C. EDDY, OF PROVIDENCE, RHODE ISLAND.

IMPROVED ELASTIC MALLET.

Specification forming part of Letters Patent No. 52,696, dated February 20, 1866.

*To all whom it may concern:*

Be it known that I, ALBERT C. EDDY, of the city and county of Providence, in the State of Rhode Island, have invented a new and useful article of manufacture which I term an "Elastic Mallet;" and I do hereby declare that the following specification, taken in connection with the drawings making a part of the same, is a full, clear, and exact description thereof.

Figure 1:
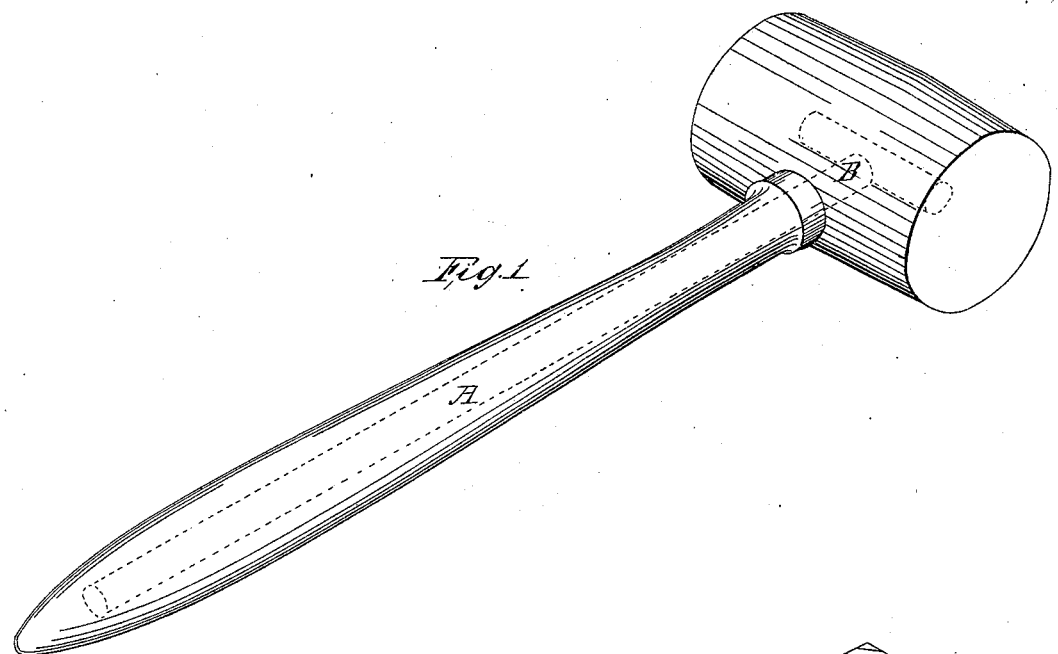
Figure 2:
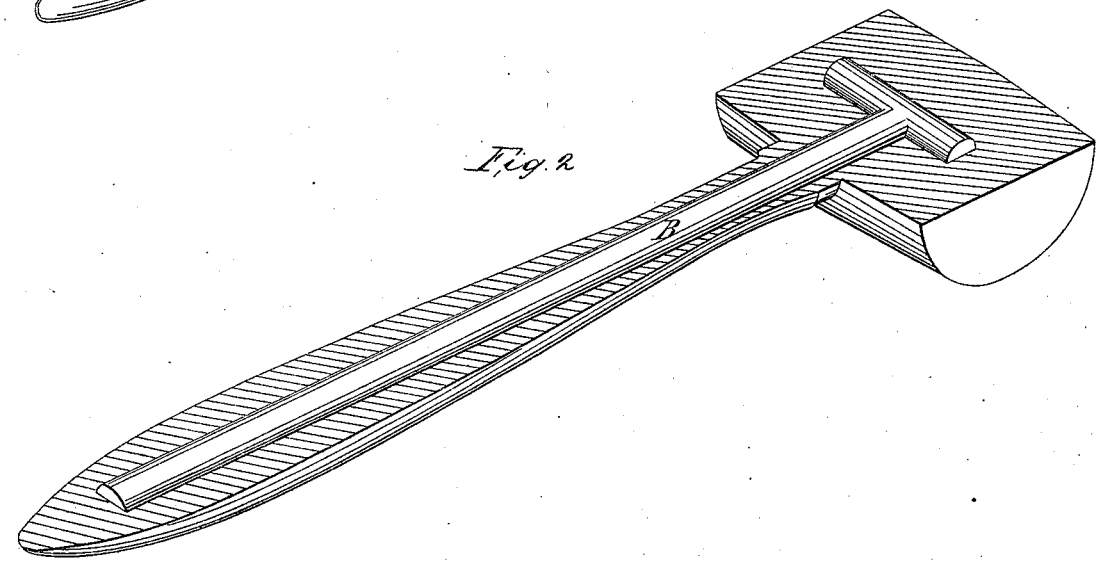

Figure 1 is a view in perspective. Fig. 2 represents the mallet divided in half, showing the internal structure.

In order that the value of my invention shall be understood, it is proper to state that in all machine-shops, cotton or woolen factories, armories, and similar establishments, it is constantly becoming necessary to make use of a mallet to drive together or adjust portions of the machinery—as, for instance, the keys to hold the fixtures in milling-machines, engine-lathes, &c., in gun and in machine shops, and to adjust the fliers of fly-frames in factories. It has been customary heretofore to make use of a soft-metal mallet, made either of copper or lead, for the purposes above mentioned, in order to prevent battering the parts of the machinery where its use is required; but inasmuch as such mallets have no elasticity they soon become shapeless masses of metal and inconvenient to use.

My invention consists in making a mallet suitable for all the purposes for which such an article is useful, which shall possess sufficient density to give the requisite blow without injuring the surface of the object struck, and sufficient elasticity to cause it to preserve its proper shape.

In the accompanying drawings, A, Fig. 1, represents a mallet made of rubber compounded with sulphur, and vulcanized in the usual way in which that material is treated in the art to which its manufacture belongs. The rubber while in a plastic state is placed in a half-mold, and it is better, for the purpose of preventing too great flexibility to the handle, to embed a T-shaped skeleton of metal, B, Fig. 2, as shown. The other half of the mold is then filled, the two parts placed together, and the whole vulcanized by heat.

What I claim as my invention, and desire to secure by Letters Patent, is—

An elastic mallet made entirely of vulcanized rubber, or of a metallic skeleton incased with rubber, the whole article being substantially as described.

ALBERT C. EDDY.

Witnesses:
 J. M. STUDLEY,
 JOHN D. THURSTON.